Aug. 27, 1935.     F. G. CHASE     2,012,753
EDGING FOR RUBBER GOODS AND METHOD OF MAKING AND APPLYING THE SAME
Filed April 12, 1935
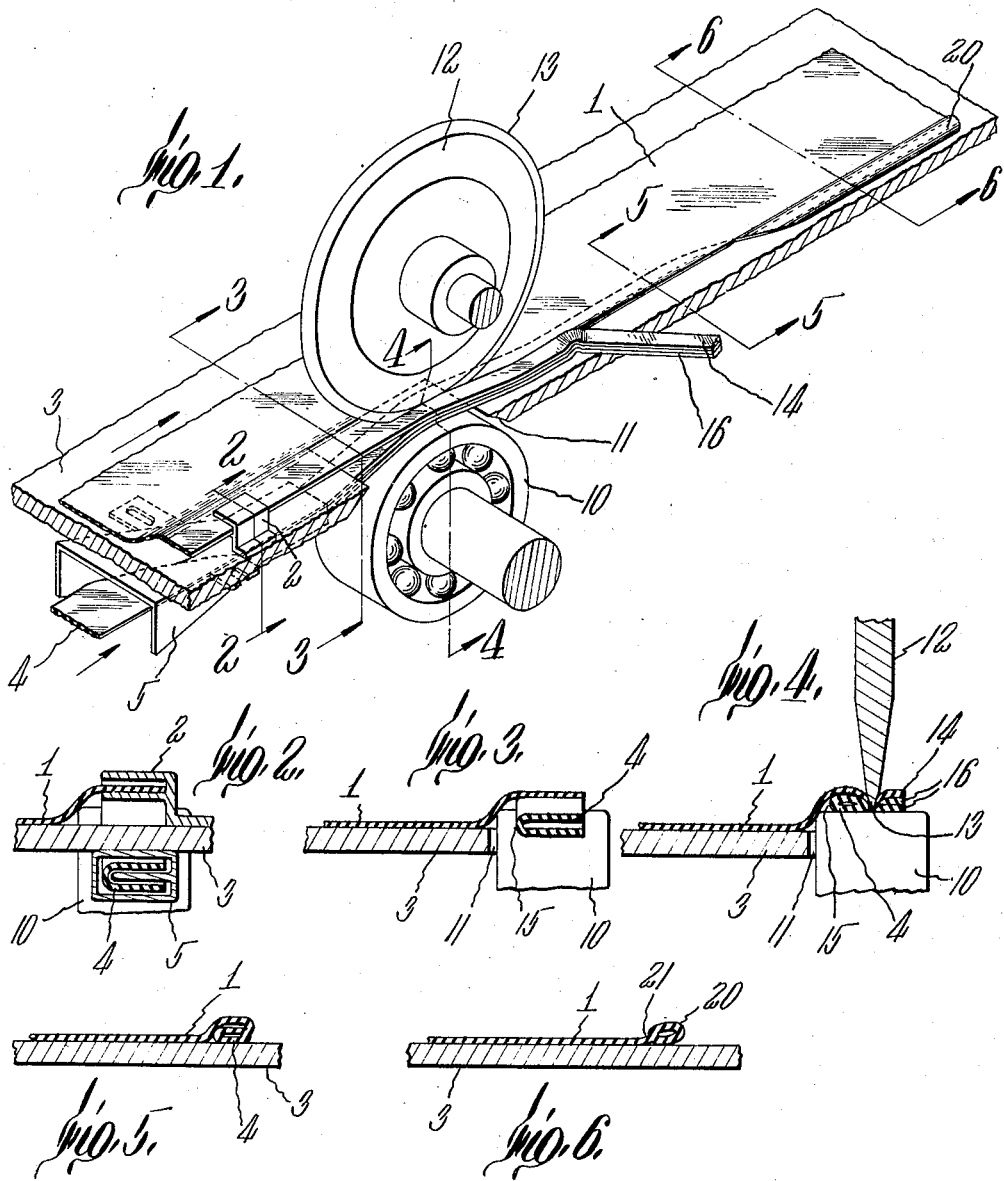

Patented Aug. 27, 1935

2,012,753

UNITED STATES PATENT OFFICE 2,012,753

EDGING FOR RUBBER GOODS AND METHOD OF MAKING AND APPLYING THE SAME

Frank G. Chase, Canton, Mass., assignor to Plymouth Rubber Company, Inc., Canton, Mass., a corporation of Massachusetts Application April 12, 1935, Serial No. 16,105

3 Claims. (Cl. 154—42)

This invention relates to the finishing of the edges of sheet material goods formed of, or including rubber, or the like. Such articles may be wearing apparel such as rain capes, and coats, bathing suits, caps, or other articles such as waterproof bags, table covers, etc., wherever a neat and, if desired, ornamental edge finish is desirable.

In accordance with the present invention the edging comprises a folded strip of sheet rubber or rubber-containing material presenting the fold outwardly and having its edges fused together and to the main body of material so as to become integral therewith. Where this strip is of a different color from the main body a highly ornamental effect is produced.

In order to apply this edging easily and rapidly the folded strip and the main body may be brought together into lapping relation and trimmed, the trimming operation itself, besides producing a smooth even edge for both parts, fusing them together along the cutting line. The goods with the edge thus applied may then be cured or vulcanized.

For a more complete understanding of this invention reference may be made to the accompanying drawing in which Figure 1 shows in perspective and somewhat diagrammatically apparatus by which this edge may be formed and applied.

Figures 2 to 6, inclusive, are detail sections on the corresponding section lines of Figure 1.

Referring to the drawing, at 1 is indicated sheet material to which the edging is to be applied. This material comprises rubber and is shown as in the form of a rubber sheet. It is in uncured and unvulcanized condition when the edging is applied thereto, and is guided so that the edging may be applied progressively thereto by any suitable means such as a gage shown at 2 carried by the top of the work table 3. The edging which is to be applied is shown as formed of a strip of uncured rubber sheeting as at 4, which is led through a suitable folder indicated at 5, and which is shown as placed beneath the work table. This folder is so shaped as to fold the strip 4 on itself in substantially U form, as shown in Figure 2, and from this folder it passes over a platen roll 10 which is shown as positioned within a slot 11 in the table 3, and free to revolve. The edge of the goods 1 is led from the gage over the folded edge 15 of the strip 4 in superposed relation to this strip over the platen roll 10, as shown in Figure 3. Cooperating with this platen roll 10, is shown a rotary cutter 12 having a cutting edge 13 positioned to cut through the material 1 and both layers of the strip 4, as shown in Figure 4, trimming the edge of the goods 1, forming a waste strip 14, and also trimming both edges of the strip 4, forming the waste strips 16. The action of the knife 12 not only thus trims the parts, but it acts to fuse or cut-seam the adjacent trimmed edges of both the goods 1 and the strip 4 together.

As shown in Figures 4 and 5 the folded edge portion of the strip 4 is then underlying the edge of the goods 1. As the material thus edged passes away from the cutting wheel 12, the folded edge portion either springs, or is turned, outwardy as shown in Figure 6 forming the desired edge for the goods 1.

It will be noted that this edge consists of a loop or tube 20 formed of the folded portion of the strip 4, the opposite sides of which are integrally united along the line of trim, as at 21, with each other and with the main body of the goods 1 at its extreme edge. The edging does not embrace the edge of the main body of the goods, but is united thereto in the nature of a butt weld, so that when the parts are of different colors the line of demarcation is clear cut and lies in an angle which is sharpest on that side of the goods which rested on the table and which gives somewhat the appearance of stitching. The goods are then vulcanized and otherwise finished.

The cutting knife 12 acts not only to trim the parts and fuse them together, but also to feed the material through the machine, so that the edging is applied progressively as the work is presented to the cutting knife.

While the materials shown, both the main sheet and the edging are rubber sheeting, one or both may contain fabric or other material so long as there is sufficient rubber or like material to produce fusion of the parts when they are cut together.

From the foregoing description of the method and the edge produced, it will be apparent that various changes and modifications might be made without departing from the spirit or scope of this invention as defined by the appended claims.

I claim:

1. Sheet material comprising rubber and having an edging comprising a folded exposed strip with the fold outwardly presented, the edges of said strip being cut-seamed together and to the edge of the sheet material along a single line to form an edging of tubular cross section.

2. Sheet material comprising rubber having an edging comprising a folded exposed strip with the fold outwardly presented, the edges of the folded strip and the edge of the sheet material being cut-seamed together along a single line.

3. The method of finishing sheet material comprising rubber which comprises superposing the raw edge of such material on a longitudinally folded edging strip, both being in uncured condition, and simultaneously trimming the raw edge and the edges of said strip, and fusing the adjacent edge portions of the strip and the main body of the goods together.

FRANK G. CHASE.